Figure 1:
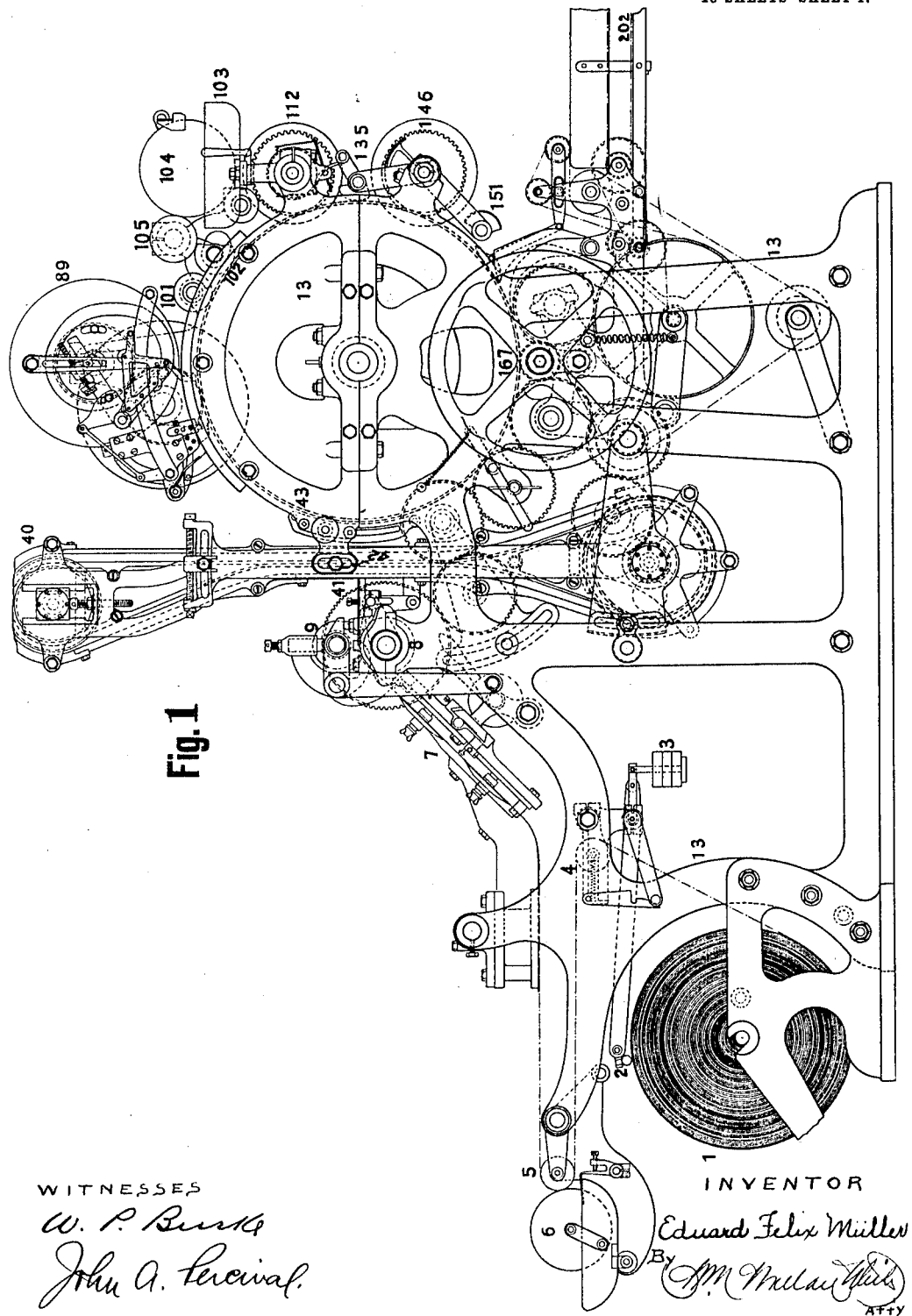

E. F. MULLER.
PAPER BAG MACHINE.
APPLICATION FILED FEB. 16, 1910.

1,020,773.

Patented Mar. 19, 1912.
18 SHEETS—SHEET 1.

WITNESSES
W. P. Burke
John A. Percival.

INVENTOR
Eduard Felix Müller
By A. M. Mullan
ATTY

E. F. MÜLLER.
PAPER BAG MACHINE.
APPLICATION FILED FEB. 16, 1910.
1,020,773.
Patented Mar. 19, 1912.
18 SHEETS—SHEET 2.
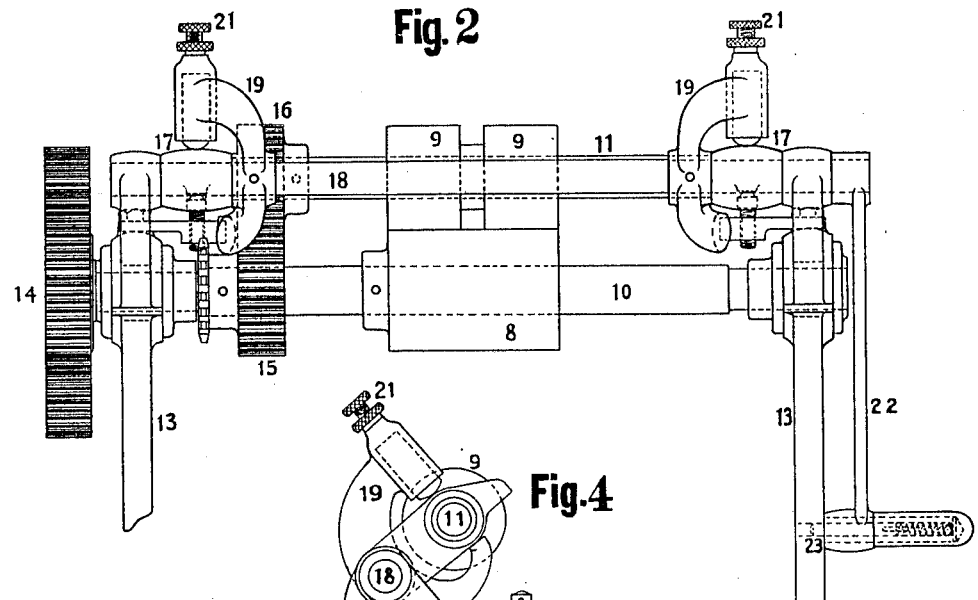
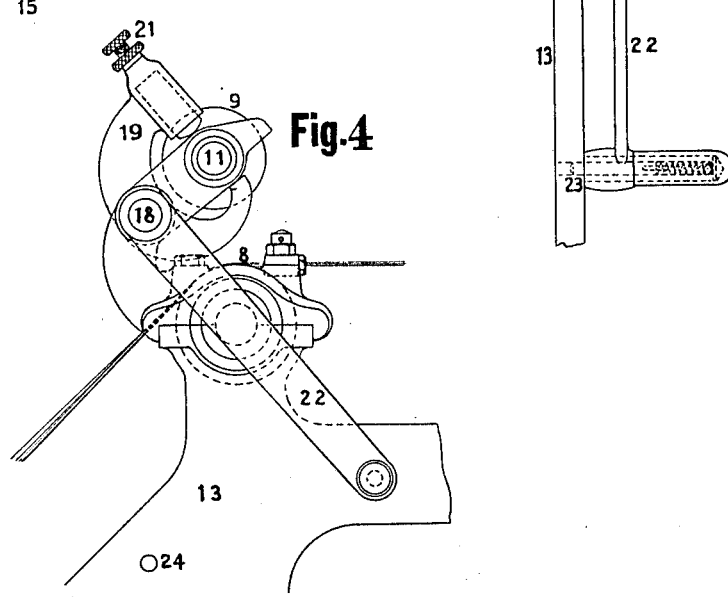
WITNESSES
INVENTOR
Eduard Felix Müller
By
Att'y

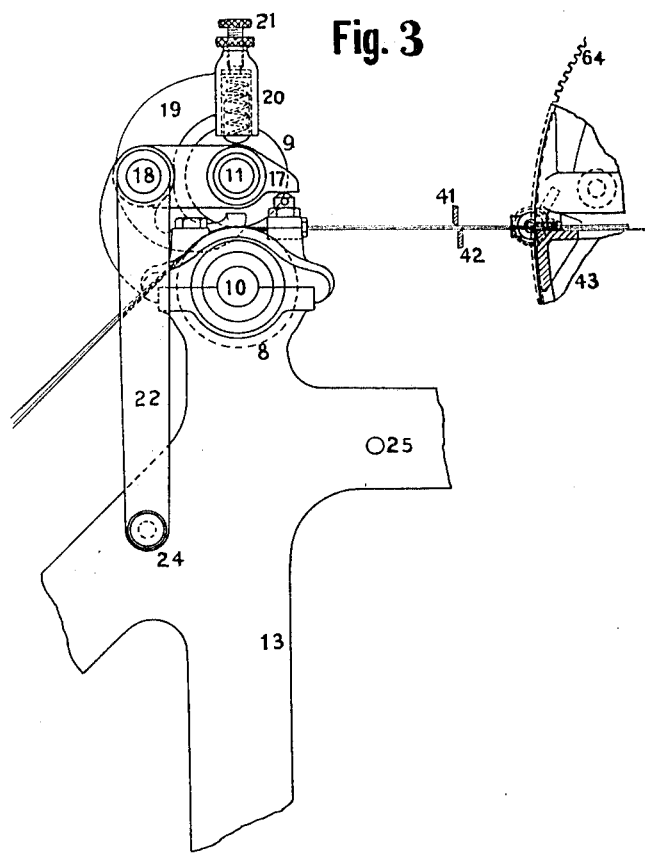

E. F. MÜLLER.
PAPER BAG MACHINE.
APPLICATION FILED FEB. 16, 1910.
1,020,773.
Patented Mar. 19, 1912.
18 SHEETS—SHEET 4.
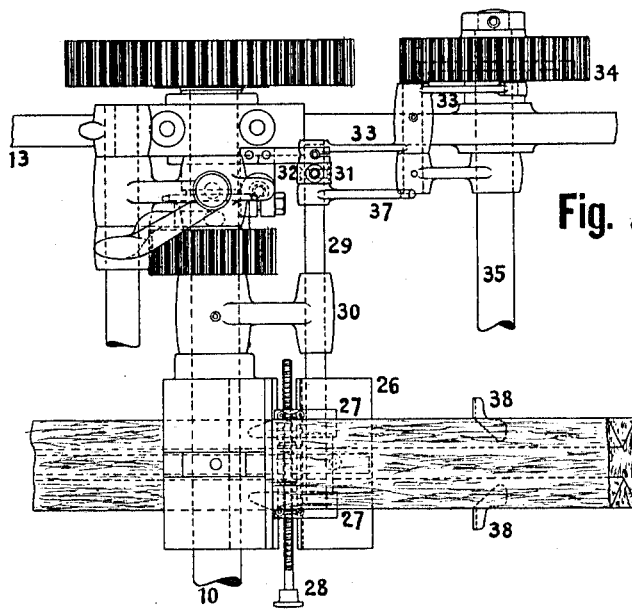
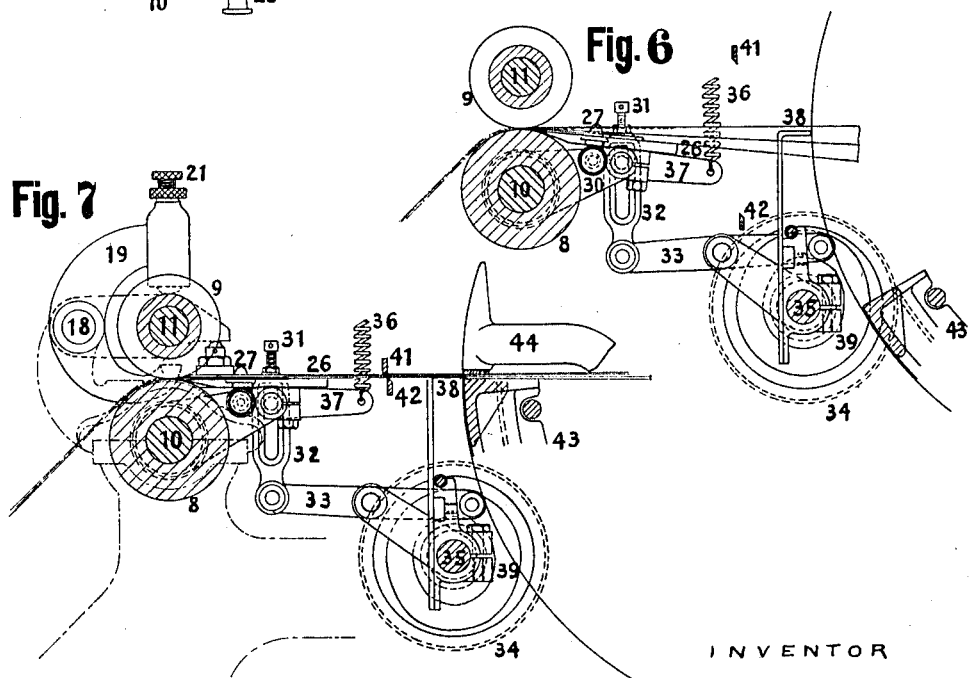
WITNESSES
W. P. Burk
John A. Percival
INVENTOR
Eduard Felix Müller.
By
Atty

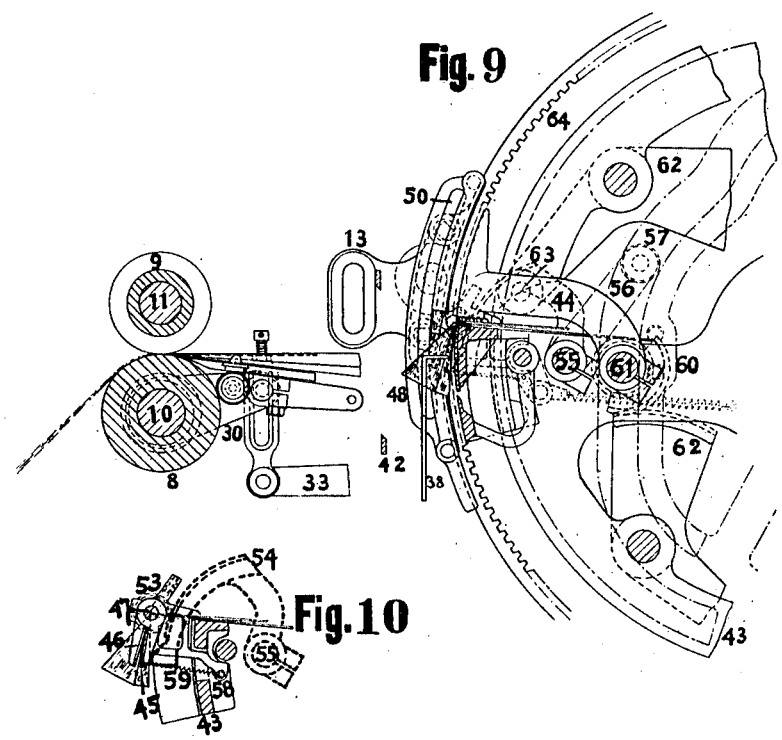

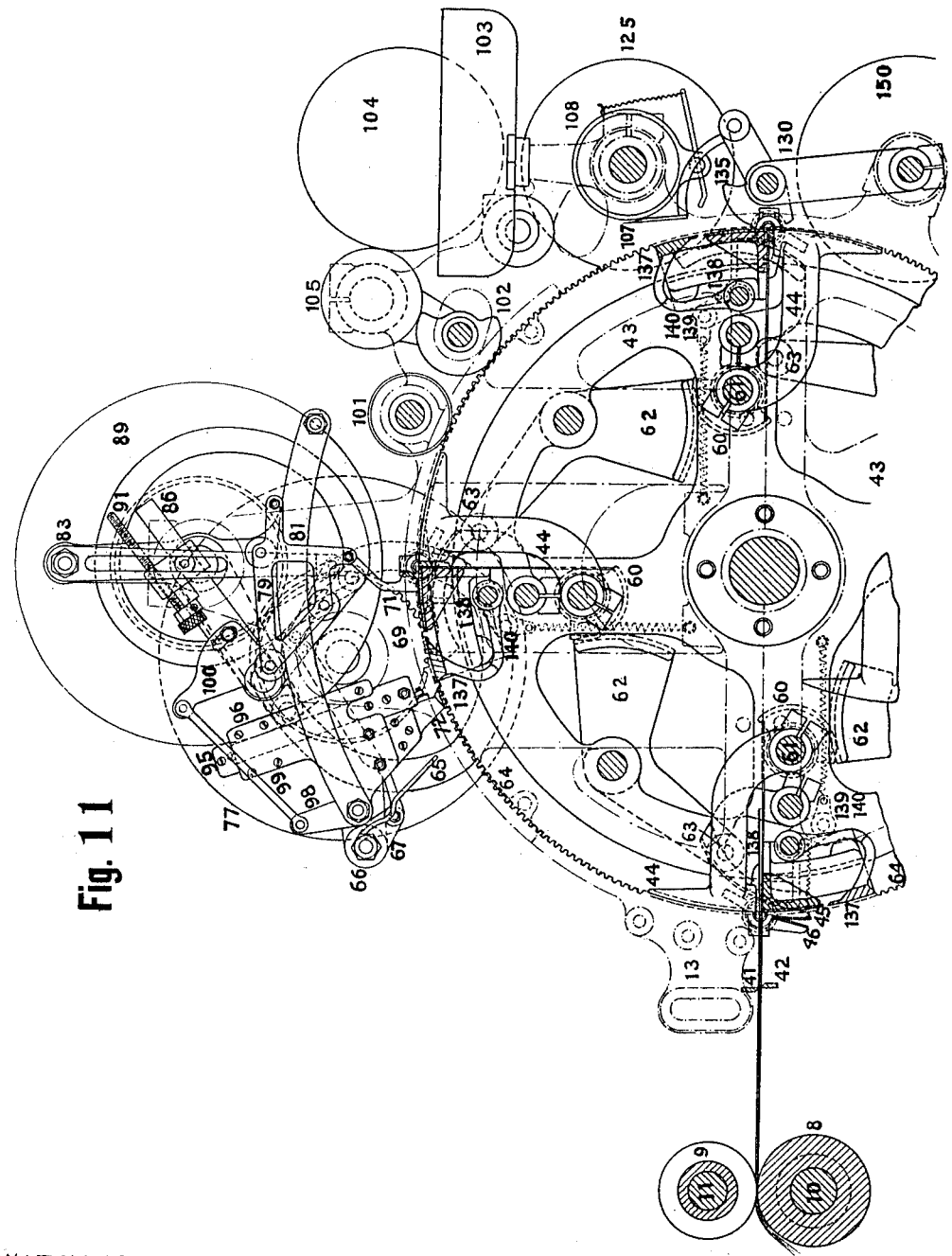

1,020,773.

PAPER BAG MACHINE.
APPLICATION FILED FEB. 16, 1910.

Patented Mar. 19, 1912.
18 SHEETS—SHEET 8.

WITNESSES
W. P. Burk
John A. Percival

INVENTOR
Eduard Felix Müller
By
Atty

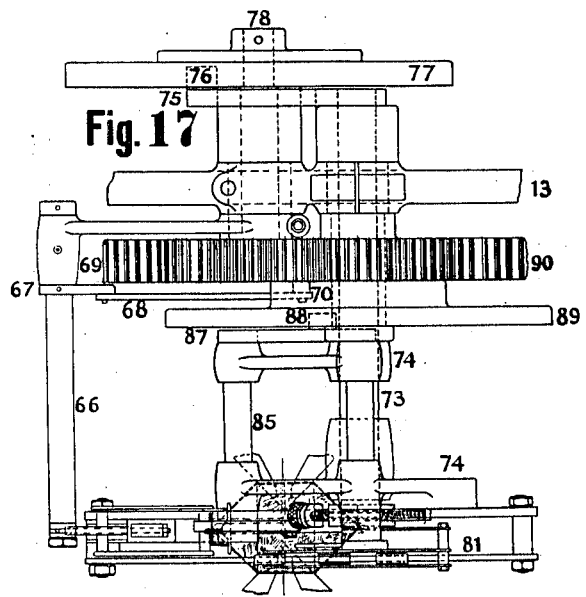
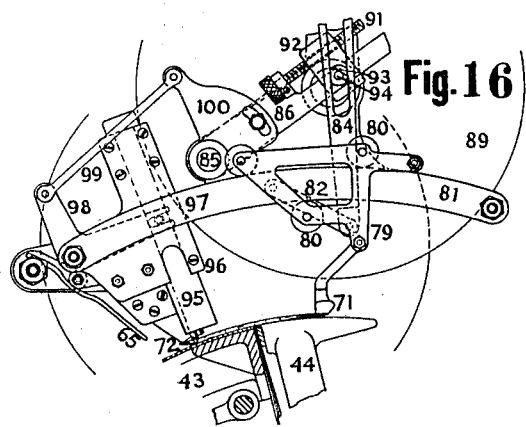

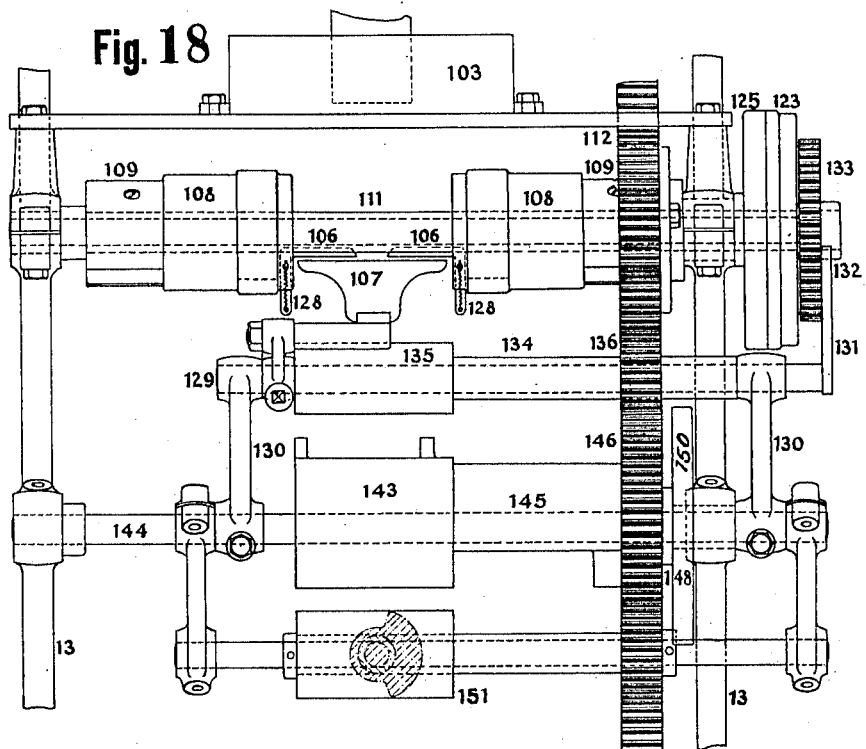
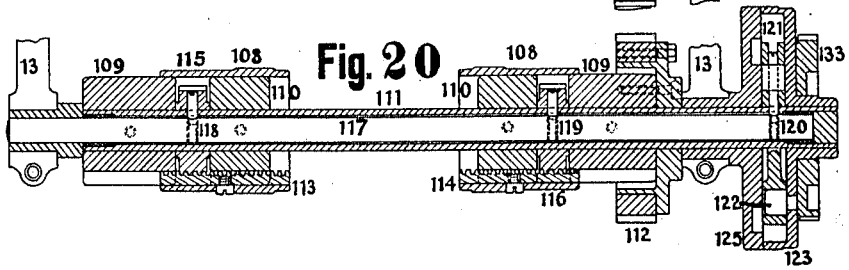

PAPER BAG MACHINE.
APPLICATION FILED FEB. 16, 1910.

1,020,773.

Patented Mar. 19, 1912.
18 SHEETS—SHEET 11.

WITNESSES
W. P. Burke
John A. Percival

INVENTOR
Eduard Felix Müller.
By
[signature]
Att'y

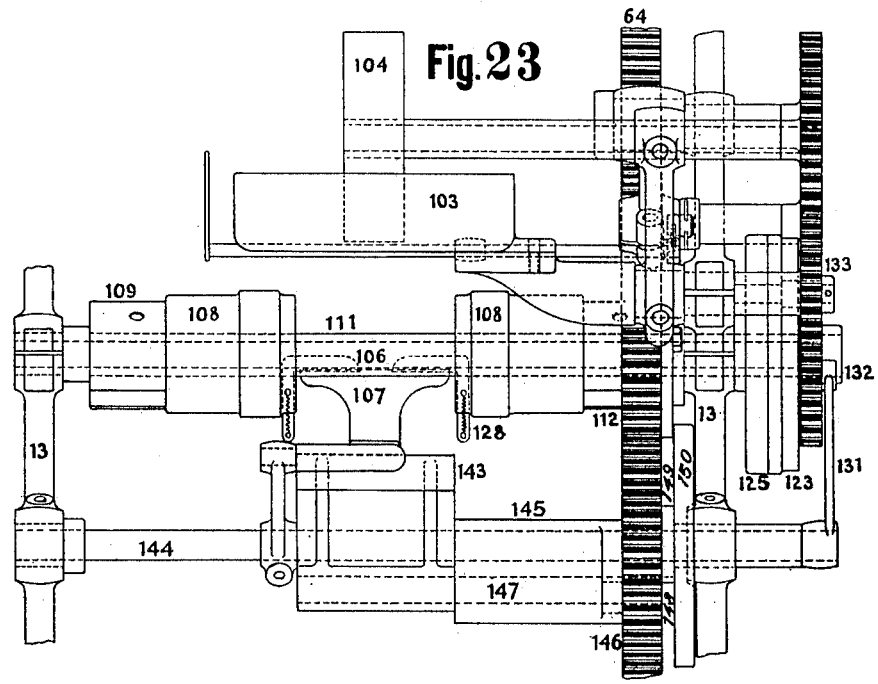

E. F. MÜLLER.
PAPER BAG MACHINE.
APPLICATION FILED FEB. 16, 1910.
1,020,773.
Patented Mar. 19, 1912.
16 SHEETS—SHEET 13.
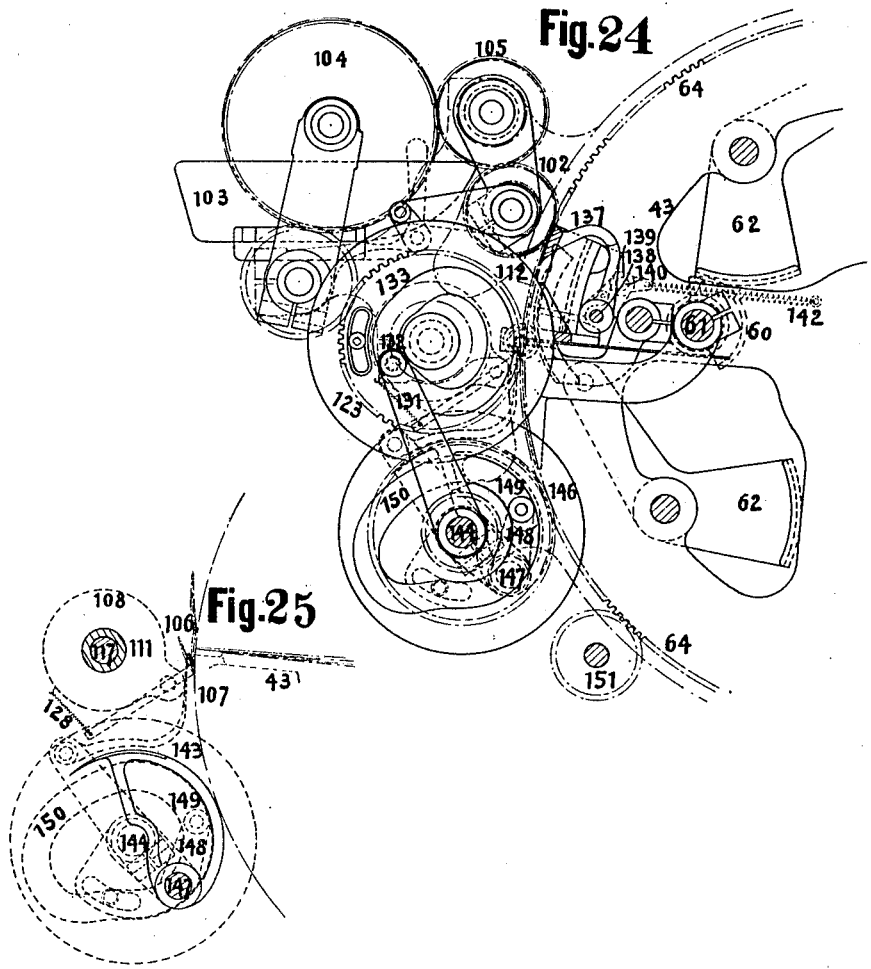
WITNESSES
W. P. Burk
John A. Percival
INVENTOR
Eduard Felix Müller.
By
Atty E. F. MÜLLER.
PAPER BAG MACHINE.
APPLICATION FILED FEB. 16, 1910.
1,020,773.
Patented Mar. 19, 1912.
18 SHEETS—SHEET 14.
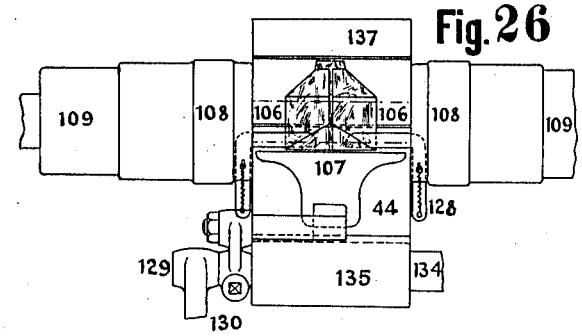
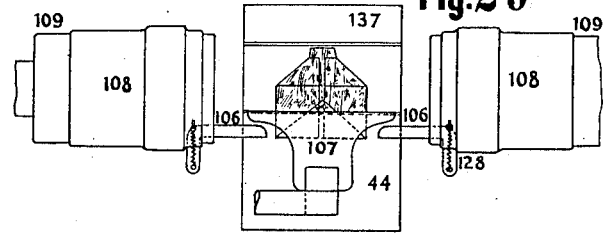
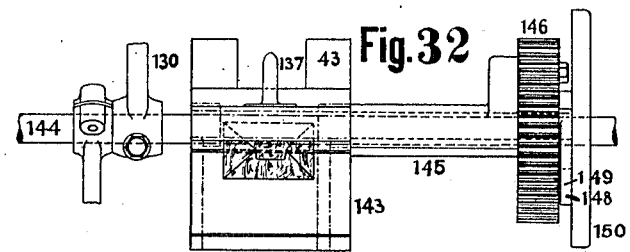
WITNESSES.
INVENTOR
Eduard Felix Müller.
By
Atty

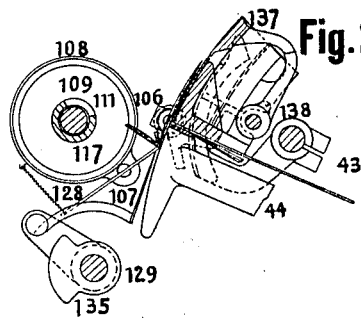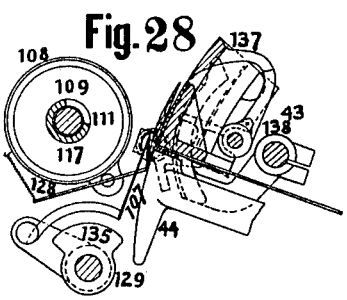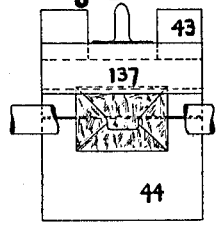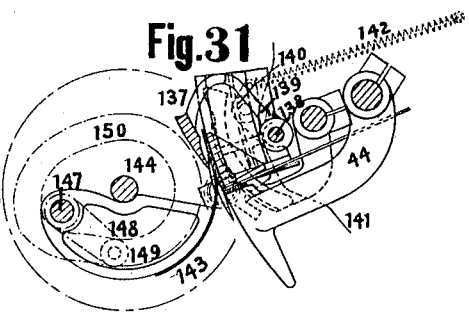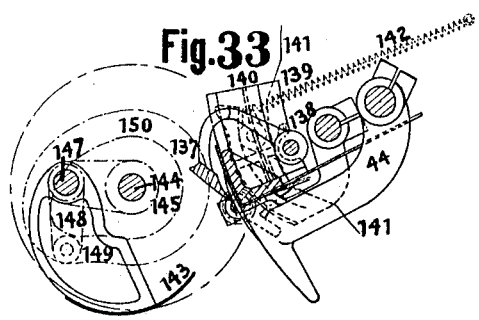

E. F. MÜLLER.
PAPER BAG MACHINE.
APPLICATION FILED FEB. 16, 1910.
1,020,773. Patented Mar. 19, 1912.
18 SHEETS—SHEET 16.
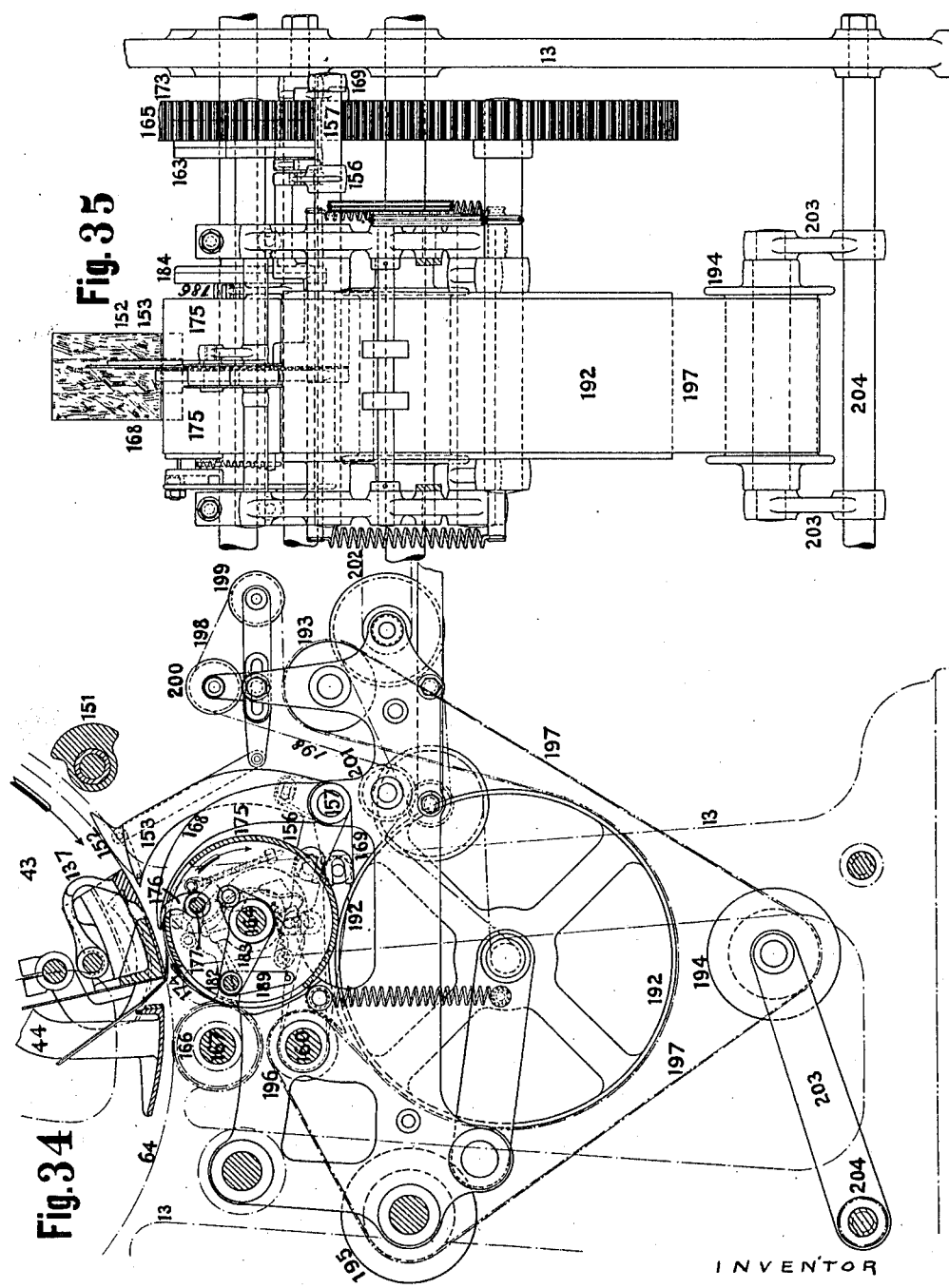
WITNESSES
W. P. Burke
John G. Percival
INVENTOR
Eduard Felix Müller.
By  ATTY.
COLUMBIA PLANOGRAPH CO., WASHINGTON, D. C.

WITNESSES
W. P. Burke
John G. Percival.

INVENTOR
Eduard Felix Müller.
By
Att'y

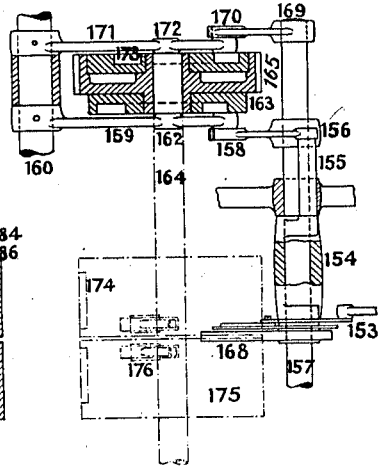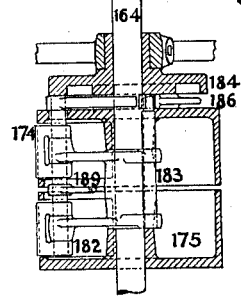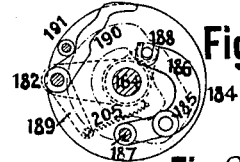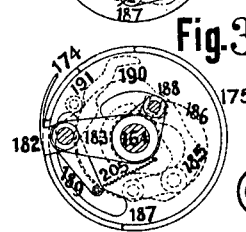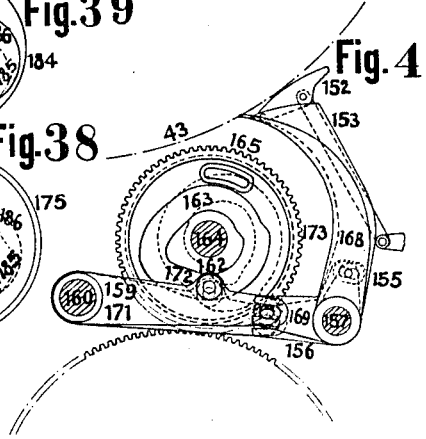

UNITED STATES PATENT OFFICE.

EDUARD FELIX MÜLLER, OF LEIPZIG-LINDENAU, GERMANY.

PAPER-BAG MACHINE.

1,020,773.  Specification of Letters Patent.  Patented Mar. 19, 1912.

Application filed February 16, 1910. Serial No. 544,295.

*To all whom it may concern:*

Be it known that I, EDUARD FELIX MÜLLER, a subject of the King of Saxony, residing at Frankfurterstrasse 36, Leipzig-Lindenau, Germany, have invented new and useful Improvements in Paper-Bag Machines, of which the following is a specification.

This invention relates to a machine for automatically manufacturing paper bags, and as herein shown and described is especially adapted to manufacture those bags known in commerce as "square-bottom" or "self-opening" paper bags, the same being a bag comprising a tucked paper tube, the right-angular fold bent inward and the rectangular bottom folded back upon the tube.

The general organization or principle of the machine is similar to that of the machine described in the specification of Letters-Patent No. 920076 and No. 940183, and the novel features consist in improvements and simplifications of the several devices by means of which the blanks are manipulated.

A construction embodying these improvements will now be described with reference to the annexed drawings, in which—

Figure 8:
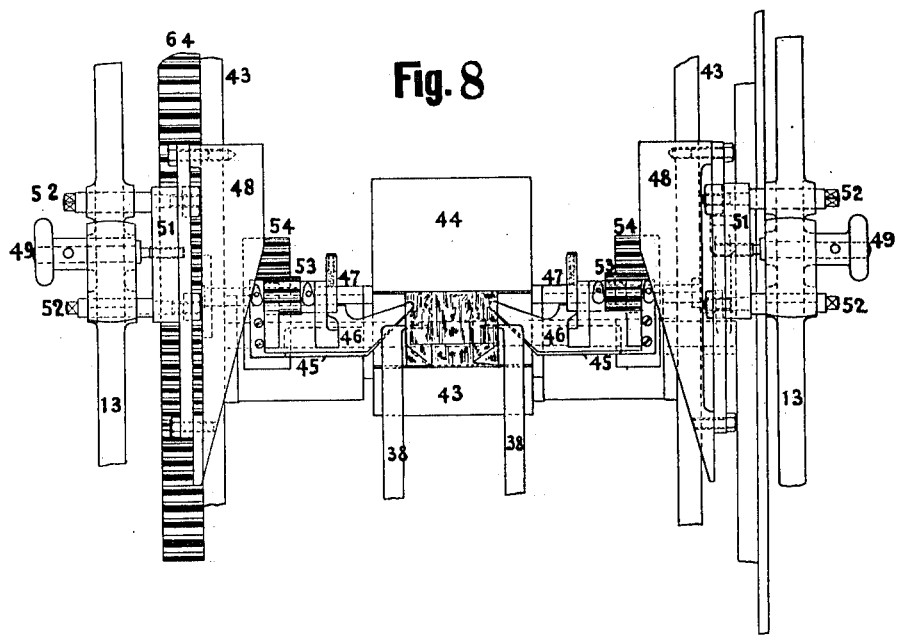

Figure 1 is a general side-view of the machine; Figs. 2 to 4 show the feed-rollers for the paper tube, in operative and inoperative position. Figs. 5 to 7 show the spreading mechanism for spreading the tucked paper tubes to allow of the entrance of tongues in the side folds. Figs. 8 to 10 show the devices for forming the box-like bottom. Fig. 11 is a section of the rotary drum, with the means for producing the so-called "diamond fold" the two flaps and the closing member; details of these devices are shown in Figs. 12 to 17. Figs. 18 to 22 show the means for folding over the two bottom flaps, the several steps of this operation being illustrated in Figs. 26 to 33. Figs. 23 to 25 show the same arrangements in somewhat altered and simpler form. Figs. 34 to 42 show the means for delivering the finished bag from the machine.

*General organization of the machine.—*
The paper from which the bags are to be made is wound upon the roll 1, which is controlled by means of a disengageable brake 2, balanced by a weight 3, in order to uniformly tension the strip of paper. The paper passes over an elastically supported roller 4, and thence between a roller 5 and a roller 6 which applies adhesive. Then the paper passes to apparatus 7 by which it is formed in the known manner into a bellows-sided or tucked tube. Beyond the apparatus 7 there are two rollers 8 and 9, the function of which is to feed the tube of paper to the cutting mechanism 40 and rotary drum 43. The grippers 44 of the drum seize the front end of the tube at the moment at which the latter is cut by the knives 41 and 42 (Fig. 1) and thus cut off a bag blank. Before the grippers engage the tube, the folded sides of the tube are spread by means of a device located between the feed rollers 8 and 9 and the cutter 40 (Figs. 6 and 7), to allow of the entrance of tongues 45 and 46 for forming the bottom (Figs. 8 and 9). These tongues are inserted and rotated in the folds, to impart a box-like shape to the "tail" of the blank engaged by the grippers, before the blank is carried by drum to the next manipulative device. The next operation is the formation of the flaps, for which purpose the box-like shape of the tail or bottom is converted into diamond shape, the closing member being cut out at the same time (Figs. 13 to 17). The bottom then passes under a smoothing roller 101 (Figs. 1 and 11) and receives an application of adhesive from a roller 102, whereupon it passes to the flap-folder, which successively folds over the front and the fastening flap (Figs. 18 to 33). The bag is then pressed by a presser 151 (Fig. 1) and then the gripper is opened and the bag engaged by the delivery mechanism and delivered to the conveyer 202.

The several manipulative devices which act upon the tube of paper in the course of its transformation into bags will now be described in detail.

*Feed-mechanism.—*The rollers 8 and 9, the function of which is to feed the paper-tube to the drum 43, are fixed to shafts 10 and 11; these shafts carry gear-wheels 15 and 16, normally in mesh with each other, and the shaft 10 also carries a gear-wheel 14 in engagement with the driving mechanism of the machine. The wheel 14 may be changeable, for the purpose of regulating the rate of feed. (Fig. 2.) To prevent deflection or distortion of the tube by the feed-mechanism it is essential that the roller 9 be uniformly pressed against the roller 8. For this purpose there is provided, at each side of the device, a spring 20, arranged in a casing carried by curved arms 19; this spring is regulatable by means of a screw 21 and bears against the bearings 17 of the shaft 11, the said bearings being mounted on a shaft 18, to which the arms 19 are fixed (Fig. 3). The arms 19 have a downward, curved extension, the end of which is so positioned under the bearings 17, that it lifts the bearings, with the roller 11, when the shaft 18 is rocked by means of a lever 22 (Fig. 4). The roller 11 is lifted, as described, for the purpose of conveniently placing the paper in position prior to the starting of the machine. The lever 22 carries a spring-pressed pin 23, by means of which it can be alternatively engaged with perforated parts of the frame at 24 and 25, in its end positions.

*Tube-expanding device.*—This is the device for spreading the tucked tube, for the insertion of the slidable tongues 45 and 46 used for the preliminary step of forming the bottom. The device comprises a vertically movable plate 26 (Figs. 5, 6, 7) on which are two tongues 27 laterally adjustable by means of a screw spindle 28 with right and left hand threads, the adjustment being made according to the size of the bag to be produced. These tongues enter the folds of the tube, and immediately after the severance of a blank the plate is lowered, so that the tongues 27 open the folds of the tube behind the severed blank, in order that two fingers 38 beyond the cutter can enter the folds and hold them open for the entrance of another pair of tongues 45 and 46. When the fingers 38 have entered the folds the plate 27 ascends and allows the tube to contract, so that the tube is in a flat state when the knives 41 and 42 are brought together to cut off another blank. The plate 26 rests upon a rod 29 having bearing in a sleeve at the end of a lever 30 rotatable about the shaft 10. The rod 29 is connected to a lever 33, by a rod 32 provided with a regulating screw 31. The lever 33 is pivoted to the frame 13 and is actuated by a cam 34, the latter being loose on a shaft 35 and connected to a gear wheel in engagement with the driving gear. The rod 32 has a longitudinal slot, by means of which it is guided on rod 29, so that the plate 26 can be moved downward in case of disarrangement of the tube. For holding the rod 29 against the regulating screw 31, and thus pressing up the plate 26, a spring 36 attached to the frame is connected to a lever 37 fixed to the rod 29. The fingers 38 are fixed with their ends nearly in contact with the revolving drum 43; they are adjustable, according to the width of the bag, on a holder 39 mounted on the shaft 35. At the moment at which a blank is severed from the tube by the rotating knives 41, 42 (Figs. 1 and 7), the front end of the blank is engaged by grippers in the drum, the tail end, from which the bottom is to be formed, remaining free. The grippers 44 are opened and closed by means of a toothed segment 60 mounted with the upper gripper-jaw on a shaft 61 (Figs. 9 and 11). The segment 60 meshes with a segment 62 integral with a lever carrying a roller which rides upon a fixed cam, not shown in the drawing. The drum 43 has a ring of teeth 64 in engagement with the pinion 166 of the driving shaft 167.

The first operation performed on the blank is the operation of imparting a box-like shape to the bottom-piece. This is effected by turning the tongues 45 and 46, which are slidable on a rod 47 (Fig. 10). These tongues are moved inward by abutments 48 fixed to holders 51 (Fig. 8). The latter are carried by bolts 52 slidable in holes in the frame 13, and are laterally adjustable by means of screw-spindles 49, for regulating the depth to which the tongues enter the folds of the blank. The abutments are rigidly connected to slotted guides 50 in which guides the nuts of the screw bolts 52 adjust the abutments radially to allow of timing the action of the tongues according to the width of the blank. Each tongue 46 carries a small pinion 53 meshing with a toothed segment 54 fixed to a shaft 55 (Figs. 8 and 9). The shaft 55 is rotated by means of a lever 56, which carries a roller 57 engaged with a fixed box-cam indicated in dotted lines in Fig. 9. By rotation of the shaft 55 the tongues 46 are rotated, and by this means the box-shape is imparted to the tail end of the blank. The segments 54 have projections (Fig. 10) by which the tongues 45 are thrust away from the circumference of the drum, in order to prevent displacement of the blank when the tongues are entering the side folds of the blank. Springs 59 fixed at 58 pull the tongues 45 back to normal position.

Figure 13:
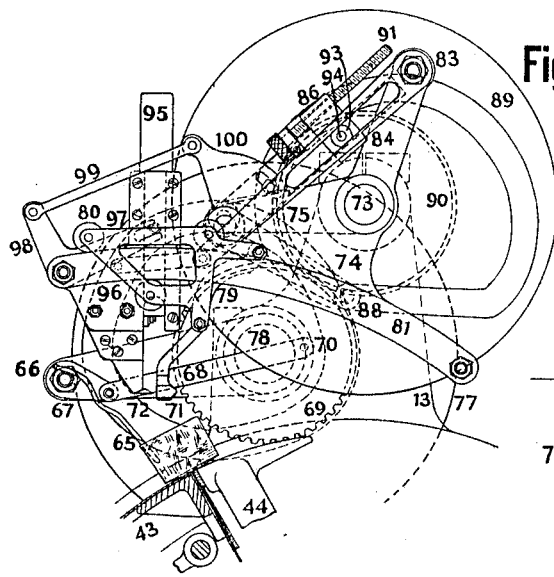
Figure 15:
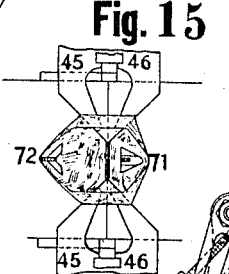
Figure 12:
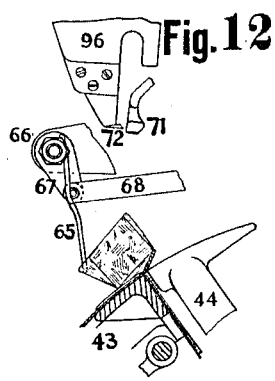
Figure 14:
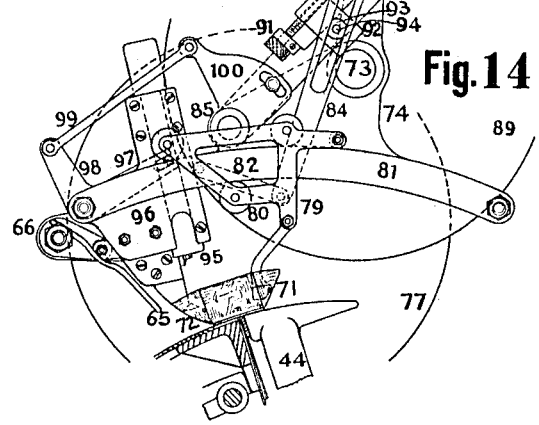

The box-shape of the tail end must be converted into the so-called diamond shape for the purpose of formation of the bottom-flaps. For this purpose a finger 65 (Fig. 12) is swung into the "box" by means of a shaft 66 which is rocked by means of a lever 67, rod 68 and crank-pin 70 fixed to a toothed wheel 69 (Fig. 13). The purpose of the finger 65 is to adequately widen the bottom for the entrance of a reciprocating and rocking finger 71 and a finger 72 which also acts as a knife (Figs. 13 and 14). These fingers 71 and 72 rock with a casing 74 fixed to a shaft 73, the rocking movement being imparted by a lever 75 rigidly connected to shaft 73 which is boxed in frame 13. Lever 75 carries a roller 76 (Fig. 17) in engagement with a box-cam 77 fixed to a shaft 78; the gear-wheel 69 on the latter meshes with the teeth 64 of the drum. In addition to its rocking movement the sliding finger 71 receives reciprocating movement by means of a carriage 79 traveling with rollers 80 upon a rail 81 fixed to casing 74 (Figs. 14 and 16). The carriage 79 is reciprocated by means of a rod 82 and a lever 84 pivoted at 83, the lever 84 being actuated by means of a lever 86 fixed to a shaft 85, boxed in casing 74. Shaft 85 is rocked by a lever 87 carrying a roller 88 engaged with a box-cam 89 loosely mounted on the rocking shaft 73 and having a gear-wheel 90 meshed with the wheel 69 (Fig. 17). For adjusting the travel of the finger 71 according to the size of the blank the lever 86 carries a slide 92 adjustable by means of a screw-spindle 91, for the purpose of displacing a slide-block 93 carried by a pin 94 mounted on slide 92 in a slot of the lever 84. By this means the stroke of the lever 84 and the movement of the carriage 79 can be varied.

While the fingers 71 and 72 impart an elongated shape to the "box" (Figs. 16 and 17) a slide 95 has been moved down, with a knife which co-acts with the finger 72 and cuts out the fastening flap at the moment at which the elongation is completed. The slide 95 is guided in a casing 96 carried by the casing 74 and rail 81. The slide 95 is connected by a pin 97 to a bell-crank 98 (Fig. 16) actuated by a rod 99 and lever 100, the latter being adjustable on the lever 86 which moves the carriage 79.

Figure 21:
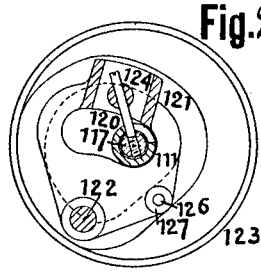
Figure 22:
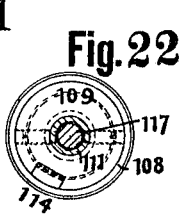
Figure 37:
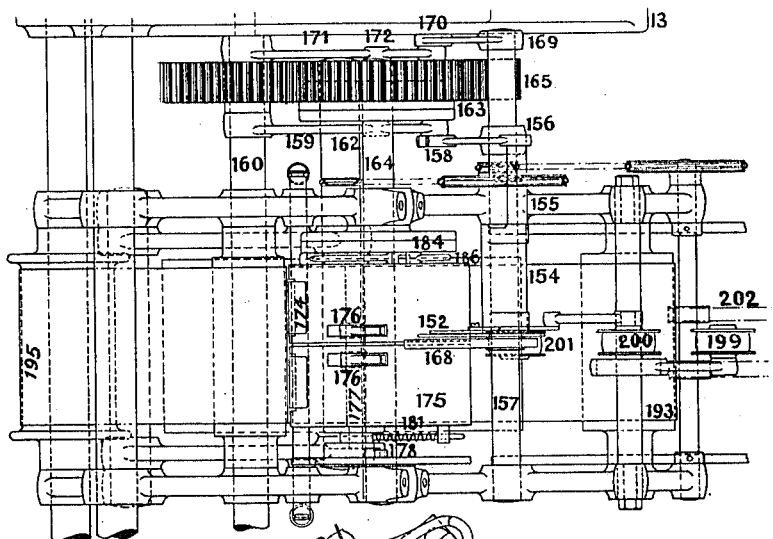
Figure 36:
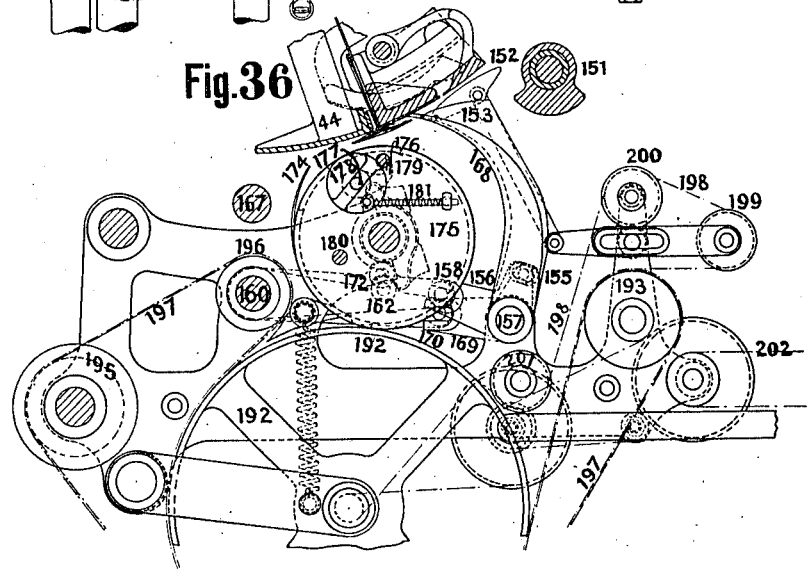

*Folding the bottom-flaps.*—The blank now passes to a smoothing roller 101 and to a roller 102 (Figs. 1 and 11) which applies adhesive received from a vessel 103 by means of rollers 104 and 105. Then the blank passes to the mechanism for folding the flaps, the front or under-flap and the top or fastening-flap being dealt with by separate devices. The former is folded by the co-action of fingers 106 and a folding plate 107. The fingers 106 are applied to the flap from above, exactly at the folding line (Figs. 18, 26 and 23). These fingers are mounted in tubular members 108, which are rotated and also reciprocated, the reciprocation being for the purpose of disengaging the fingers from the flap after the folding operation, while the blank passes on, carried by the rotating drum 43. For the purpose of rotation the members 108 are mounted upon blocks 109, 110 fixed rigidly to a hollow shaft 111, and a gear-wheel 112 fixed to the latter meshes with the teeth 64 of the drum (Fig. 20). The reciprocating movement is imparted by means of racks 113 and 114 fixed to the members 108 and meshing with spiral gears 115 and 116. The latter are connected to a shaft 117 within the shaft 111, by means of pins 118 and 119 which pass through slots in the shaft 111 and fit exactly into holes in the spiral gears 115 and 116. The shaft 117 has at one end a pin 120, which also traverses a slot in the shaft 111, and by means of which the shaft 117 receives an alternately slow and rapid rocking movement, while rotating with the shaft 111. For this purpose the pin 120 is rocked by means of a rocking arm 121 pivoted at 122 to a disk 123 fixed to the shaft 111. This arm carries a rotatable pin 124 having a hole traversed by the pin 120. The arm 121 is rocked by means of a box-cam 125 which is fixed to the frame 13 and forms a bearing for the shaft 111. This cam is engaged with a roller 127 pivoted at 126 to the arm (Fig. 21).

The fingers 106 are pivoted to the members 108; springs 128 bear against them so that they are pressed firmly against the flap during the folding thereof.

Figure 19:
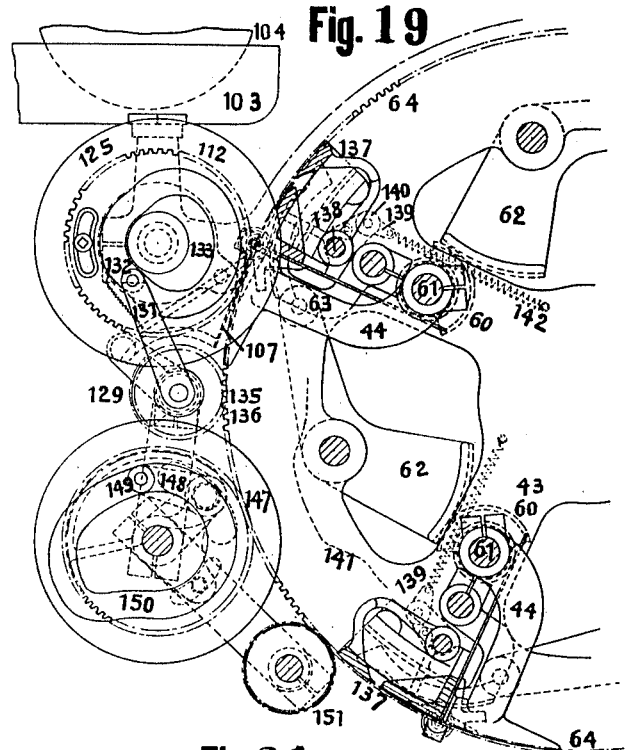

During the movement of the fingers 106 the plate 107 is placed below the blank, and slightly removed from the circumference of the drum (Figs. 25, 27 and 28), so that it folds over the flap moved against it by the drum. The plate 107 is connected to a shaft 129 which is carried by fixed arms 130 and has fixed to it a lever 131 (Fig. 19) engaged by means of a roller 132 with a cam 133 (Figs. 18 and 19). Arms 130 are clamped to a shaft 144 mounted in bearings of frame 13. The folded flap is pressed down firmly by means of a segment 135, mounted with a toothed wheel 136 on a hollow shaft 134, which is rotated by means of the drum-rack 64. Hollow shaft 134 is loosely mounted on the rocking shaft 129.

The fastening flap is folded by means of arms 137 (Fig. 31) fixed to shaft 138 in the drum 43. The shafts 138 have arms 139 engaged by means of rollers 140 with cams 141 fixed to the frame. Springs 142 restore the arms 139 to normal position. The folding of the fastening flap by the arms 137 takes place at the time when the edge of a circular rotating folding plate 143 abuts against the folding line. The plate 143 also has a rocking movement, to enable it to clear the blank afterward (Fig. 33). For this purpose a hollow shaft 145 mounted on a fixed shaft 144 carries a gear-wheel 146 in mesh with the drum-rack 64 (Fig. 32). The hollow shaft 145 has a forked arm forming a bearing for a rocking shaft 147 to which the plate 143 is fixed. An arm 148 of the shaft 147 is engaged by means of a roller 149 with a cam 150 fixed to the frame 13 (Fig. 33). The plate 143 may also, without material modification, be used for pressing the flaps after the folding of the front flap, *i. e.* for performing the function of the segment 135 (Figs. 18 and 19). In that case the rocking plate 107 is fixed to the shaft 144 (Figs. 23, 24 and 25) and this shaft is rocked by means of lever 131 and cam 133. This also simplifies the folding device for the front or lower flap.

When the fastening flap has been folded over the bag passes under a rotating segment 151, by which the pasted seams are again firmly pressed. This operation finishes the bag, and the latter is ready to be dealt with by the delivery mechanism. The bag travels toward the delivery drum 175. In order to prevent the opening again of the fastening flap, a transfer guide 152 rocking with about the speed of the circumference of the drum, is placed between the delivery drum and rotating segment 151. The guide 152 consists of a narrow strip of metal rocked by means of a lever 153 connected by a sleeve 154 and pin 155 to a lever 156 rotatable on a shaft 157 (Fig. 42). The free end of the lever 156 is slotted to engage a pin 158 fixed to a lever 159. The latter is rotatable on a shaft 160 and is engaged by a roller 162 with a box-cam 163 fixed to a gear-wheel 165 upon a shaft 164, the wheel 165 being driven by a pinion 166 of the driving shaft 167. The pinion 166 drives also the drum-rack 64 (Fig. 34).

When the bag has passed the transfer device 152 a finger 168 is swung forward at greater speed than the drum, the movement being imparted by a shaft 157 having an arm 169 slotted to engage a pin 170 fixed to a lever 171 rotatable on the shaft 160, the lever 171 being engaged by a roller 172 with a box-cam 173 fixed to the toothed wheel 165 (Fig. 42). The finger 168 co-acts with a delivery-drum 175. Almost at the same moment the bottom of the bag is engaged at the other end by fingers 174 of the delivery-drum 175 rotating in the same direction to the main drum 43. The bag is seized by grippers 176 in the drum 175, which begin to close when the finger 168 is almost in contact with the delivery-drum 175. The grippers 176 are mounted on a shaft 177 (Fig. 36) which carries a cam 178 (Fig. 36) and is actuated by engagement of said cam with pins 179 and 180, for the purpose of opening and closing the grippers. The grippers are temporarily held in open and closed position by a spring 181. Inasmuch as the grippers 176 cannot be instantaneously closed, the fingers 174 must remain stationary for a short period, in order to retain the bag. For this purpose the fingers 174 are mounted on a shaft 182 carried by a bell-crank 183 (Figs. 38, 39 and 40) which revolves with the drum 175 but is alternately accelerated and retarded by means of a fixed cam 184, roller 185 and lever 186 pivoted at 187 to the drum 175, the lever 186 being slotted to engage a pin 188 fixed to the bell-crank 183. An arm 189 fixed to the shaft 182 is connected to a spring 205, which tends to rock the fingers 174 outward to the limit allowed by an arm 190 and abutment roller 191.

The drum 175 carries the bag to a disk-wheel 192, whereupon the grippers 176 are opened by the pin 180 and the fingers 174 release the rear end of the bottom. The bag is now engaged by the disk 192 and conveyer-band 197 (Figs. 34 and 36) traveling over rollers 193, 194, 195 and 196, the pasted seams being again firmly pressed. The conveyer-band 197 co-acting with a band 198 traveling over rollers 199, 200 and 201, carries the bag to the delivery conveyer 202. The conveyer-bands are tensioned by means of levers 203 which are adjustable about a shaft 204 and carry the roller 194.

The working of the machine is as follows: The paper is taken from the roller 1 upon which rests brake 2 in order to uniformly tension the strip of paper. The paper passes roller 4 and thence between a roller 5 and 6 which applies adhesive. Then the paper passes to apparatus 7 by which it is formed in the known manner into a bellows-sided or tucked tube. Driving rollers 8 and 9 feed the tube of paper to the cutting mechanisms 40 and rotary drum 43. The grippers 44 of the drum seize the front end of the tube at the moment at which the latter is cut by the knives 41 and 42 and thus cuts off a bag blank (Fig. 1). The grippers of the drum engage the tube, tongues 45 and 46 enter the side folds and open out the blank in the box-like shape (Figs. 8 and 9). Fingers 71 and 72 convert the box-like shape in the diamond shape, the closing member being cut out at the same time (Figs. 13 to 17). The bottom then passes under a smoothing roller 101 (Figs. 1 and 11) and receives an application of adhesive from a roller 102, whereupon it passes to the flap-folder, which successively folds over the front and the fastening flap (Figs. 18 to 33). The bag is then pressed by a presser 151 (Fig. 1) and then the gripper is opened and the bag engaged by the delivery mechanism and delivered to the conveyer 202.

I claim—

1. In a paper bag machine, in combination, means for feeding a strip of paper from a suitable source of supply, means for forming the strip into tubular form with lateral folds therein, means for cutting the formed paper into blanks, a drum, gripping means carried thereby for gripping the blanks, tongues carried by said drum for imparting a box shape to one end of the blanks, vertically movable tongues positioned in the path of the folds and interposed between said forming means and said drum for engaging and spreading the folds, and other tongues positioned in the path of the folds and in proximity to the circumference of said drum for engaging and maintaining said folds in spread condition, whereby said first mentioned tongues carried by said drum may engage therewith.

2. In a paper bag machine, in combination, means for feeding a strip of paper from a suitable source of supply, means for forming the strip into tubular form having lateral folds therein, means for cutting the formed paper into blanks, a drum, gripping means carried thereby for gripping the blanks, tongues carried by said drum for imparting a box shape to one end of the blanks, vertically movable and laterally adjustable tongues positioned in the path of the folds and interposed between said forming means and said drum for engaging and spreading the folds, and laterally adjustable tongues positioned in the path of the folds and in proximity to the circumference of said drum for engaging and maintaining the folds in a spread condition, whereby said first mentioned tongues carried by said drum may engage therewith.

3. In a paper bag machine, in combination, means for feeding a strip of paper from a suitable source of supply, means for forming the strip into tubular form having lateral folds therein, means for cutting the formed paper into blanks, a drum, gripping means carried thereby for gripping the blanks, tongues carried by said drum for imparting a box shape to one end of the blanks, a vertically movable plate interposed between said forming means and said drum, laterally adjustable tongues supported thereon and adapted to engage the folds, whereby as the plate is moved in a vertical direction the folds will be spread apart, and laterally adjustable tongues positioned in proximity to said drum for engaging said folds and maintaining them in spread condition, whereby said first mentioned tongues carried by said drum may engage therewith.

4. In a paper bag machine, in combination, means for feeding a strip of paper from a suitable source of supply, means for forming the strip into tubular form having lateral folds therein, means for cutting the formed paper into blanks, a drum, gripping members supported thereby for gripping the blanks, tongues slidingly supported upon said drum for engaging the folds of the blanks, abutments having inclined surfaces co-acting with said tongues to cause sliding movement of the same, means for adjusting said abutments relatively to said tongues whereby the period of time that they operatively coact with said tongues may be varied, means for rotating certain of said tongues, means controlled by said rotating means for causing certain others of said tongues to move away from the circumference of the drum, and means for urging said other tongues to retain their normal positions.

5. In a paper bag machine, in combination, a drum, gripping means carried thereby, means for feeding tubular blanks of paper provided with lateral folds to said gripping means, means upon said drum for engaging the folds and imparting a box shape to one end of the blanks, a rock shaft positioned adjacent said drum, a finger carried by said rock shaft, means to rock said shaft to cause said finger to enter the box shaped end to expand the same, and means for forming and cutting the blank adapted to be inserted within the expanded box-shaped end thereof.

6. In a paper bag machine, in combination, a drum, gripping means carried thereby, means for feeding a tubular blank of paper provided with lateral folds to said gripping means, means upon said drum for engaging the folds and imparting a box shape to one end of the blanks, a rocking frame positioned adjacent the drum, operating means controlled by the rotation of the drum for rocking said frame, fingers carried by said frame and adapted to enter and elongate the box shaped end as the frame is rocked, one of said fingers being provided with a cutting portion, and means controlled by the rotation of said drum for reciprocating the other of said fingers.

7. In a paper bag machine, in combination, a drum, gripping means carried thereby, means for feeding tubular blanks of paper having lateral folds to said gripping means, means upon said drum for engaging the folds and imparting a box shape to one end of the blanks, a rocking frame positioned adjacent the drum, operating means controlled by the rotation of the drum for rocking said frame, fingers carried by said frame adapted to enter and elongate the box shaped end as the frame is rocked, one of said fingers being provided with a cutting portion, a carriage supporting the other of said fingers, and means for reciprocating said carriage, said means comprising a slotted lever, a pin engaging the slot and adjustably mounted on a rocking lever, and means for rocking said lever.

8. In a paper bag machine, in combination, a drum, gripping means carried thereby, means for feeding a tubular blank of paper provided with lateral folds to said gripping means, means upon said drum for engaging the folds and imparting a box shape to one end of the blanks, a rocking frame positioned adjacent the drum, operating means controlled by the rotation of the drum for rocking said frame, fingers carried by said frame adapted to enter and elongate the box shaped end as said frame is rocked, one of said fingers being provided with a cutting portion, means controlled by the rotation of the drum for reciprocating the other of said fingers, a knife adapted to co-act with said finger having a cutting portion, and means for reciprocating said knife.

9. In a paper bag machine, in combination, a drum, gripping means carried thereby, means for feeding tubular blanks of paper to said gripping means, means for forming flaps at one end of the blank, a folding plate, means for moving the same into the path of one of the flaps, folding fingers adapted to co-act with said plate, members carrying said fingers, a hollow shaft for rotating said members, means operatively associated with the drum for actuating said hollow shaft, a shaft positioned within said hollow shaft, means for intermittently rotating the same, spiral gears secured to said second mentioned shaft and racks secured to said members and meshing with said spiral gears, whereby as said second shaft is rotated said members and the fingers carried thereby will be reciprocated.

10. In a paper bag machine, in combination, a drum, gripping means carried thereby, means for feeding tubular blanks of paper to said gripping means, means for forming flaps at one end of the blanks, a curved folding plate adapted to engage the folding line of one of said flaps, a shaft upon which said plate is mounted, means operatively associated with said drum for rotating said plate, means for rocking said shaft, arms carried by the drum, and means for rocking said arms, into operative relation to said plate, whereby the flap will be folded.

11. In a paper bag machine, in combination, a drum, gripping means carried thereby, means for feeding tubular blanks of paper thereto, means for forming flaps in one end of the blanks, means for folding said flaps one upon the other to form a bag, a delivery drum adjacent said first mentioned drums, a diverting finger adapted to engage the bag and lead it to said delivery drum, means for moving said finger at a speed exceeding the circumferential speed of the first mentioned drum, fingers adapted to engage the other end of the bag bottom, said second mentioned fingers being carried by and rotatable with said delivery drum, and means for alternately causing said last mentioned fingers to project from, and recede into said delivery drum.

12. In a paper bag machine, in combination, a drum, gripping members carried thereby, means for feeding tubular blanks of paper thereto, means for forming flaps in one end of the blanks, means for folding said flaps one upon the other to form bags, a delivery drum adjacent said first drum, and rotating in the same direction therewith, grippers associated with said delivery drum, and means for alternately causing said grippers to engage and release the bags.

13. In a paper bag machine, in combination, means for feeding a strip of paper from a suitable source of supply, means for forming said strip into tubular form having lateral folds therein, a drum, cutting mechanism interposed between said forming means and said drum for cutting the formed paper into blanks, means interposed between said forming means and said drum for engaging the folds and spreading the same, gripping means carried by the drum to grip the blanks, means carried by the drum for engaging the spread folds and forming a box shape in one end of the blank, a finger adjacent the drum and adapted to enter the box shaped end, means for rocking the finger to expand the opening, fingers adapted to be inserted in the opening for elongating the same, a folding plate, reciprocating fingers co-acting therewith for folding one flap, a second folding plate, means co-acting therewith for folding a second flap, a transfer guide adapted to engage with said folded flaps, a conveyer, means for delivering the bags to the conveyer, and means for removing the bags from the drum and transferring them to the delivery means.

In testimony whereof I have signed my name to this specification in the presence of two subscribing witnesses.

EDUARD FELIX MÜLLER.

Witnesses:
KARL MAX MONTAG,
RUDOLPH E. FRICKE.

---

Copies of this patent may be obtained for five cents each, by addressing the "Commissioner of Patents, Washington, D. C."